United States Patent
Yetukuri et al.

(10) Patent No.: US 8,573,701 B2
(45) Date of Patent: Nov. 5, 2013

(54) SUPPORT MEMBER FOR VEHICLE SEAT HEAD RESTRAINT

(75) Inventors: Arjun Yetukuri, Rochester Hills, MI (US); Eric Veine, Wixom, MI (US); Mark A. Farquhar, Ortonville, MI (US); Sai Prasad Jammalamadaka, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/348,458

(22) Filed: Jan. 11, 2012

(65) Prior Publication Data

US 2012/0104821 A1 May 3, 2012

Related U.S. Application Data

(62) Division of application No. 12/243,130, filed on Oct. 1, 2008, now abandoned.

(51) Int. Cl.
*B60N 2/48* (2006.01)

(52) U.S. Cl.
USPC ..................... 297/391; 297/216.12

(58) Field of Classification Search
USPC ............................. 297/391, 216.12
See application file for complete search history.

(56) References Cited

U.S. PATENT DOCUMENTS

| | | | | |
|---|---|---|---|---|
| 4,657,304 A * | 4/1987 | Heesch et al. | ................ | 297/391 |
| 4,693,515 A * | 9/1987 | Russo et al. | ................ | 297/391 |
| 5,165,754 A | 11/1992 | Louys | | |
| 5,261,726 A | 11/1993 | Yanagishita | | |
| 5,290,091 A * | 3/1994 | Dellanno et al. | .............. | 297/391 |
| 5,660,441 A | 8/1997 | Nagayasu et al. | | |
| 5,829,832 A | 11/1998 | Molee et al. | | |
| 5,906,414 A | 5/1999 | Rus | | |
| 6,183,045 B1 | 2/2001 | Marfilius et al. | | |
| 6,213,548 B1 * | 4/2001 | Van Wynsberghe et al. | ........................ | 297/216.12 |
| 6,402,238 B1 | 6/2002 | Bigi et al. | | |
| 6,499,805 B1 | 12/2002 | Watadani | | |
| 6,719,373 B2 | 4/2004 | Zimmermann | | |
| 6,880,891 B2 | 4/2005 | Yetukuri et al. | | |
| 7,048,334 B2 | 5/2006 | Pal et al. | | |
| 7,137,668 B2 | 11/2006 | Kreitler | | |
| 7,152,928 B2 | 12/2006 | Yetukuri et al. | | |
| 7,284,795 B2 | 10/2007 | Sato et al. | | |
| 7,303,237 B1 | 12/2007 | Hughes | | |
| 2010/0060066 A1 * | 3/2010 | Hojnacki et al. | .............. | 297/391 |

FOREIGN PATENT DOCUMENTS

| | | |
|---|---|---|
| DE | 19652591 A1 * | 6/1997 |
| DE | 10 2004 030 215 A1 | 1/2005 |
| DE | 602 13 722 T2 | 8/2007 |
| EP | 1275554 A1 | 1/2003 |
| FR | 2796017 A1 | 1/2001 |
| JP | 9140505 A | 6/1997 |

* cited by examiner

*Primary Examiner* — David Dunn
*Assistant Examiner* — Tania Abraham
(74) *Attorney, Agent, or Firm* — Brooks Kushman P.C.

(57) ABSTRACT

A head restraint assembly for a vehicle seat has a head restraint post adapted to be mounted to the vehicle seat. A support member is coupled to the head restraint post. The support member having a plurality of attachment receptacles to mount the head restraint post to one of the plurality of attachment receptacles. A compressible pad member is mounted to the support member. A convex outer surface provides support for a head of an occupant. The support member is mounted to head restraint post at one of the plurality of attachment receptacles positions the compressible pad at a distance from the convex outer surface.

17 Claims, 4 Drawing Sheets

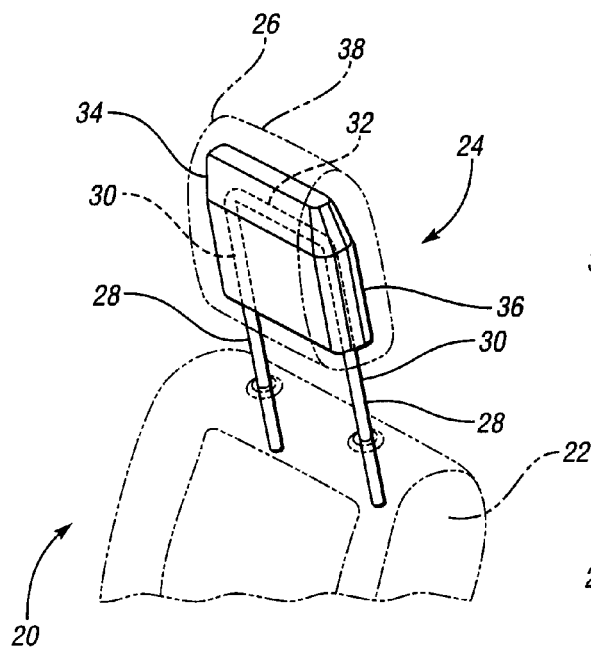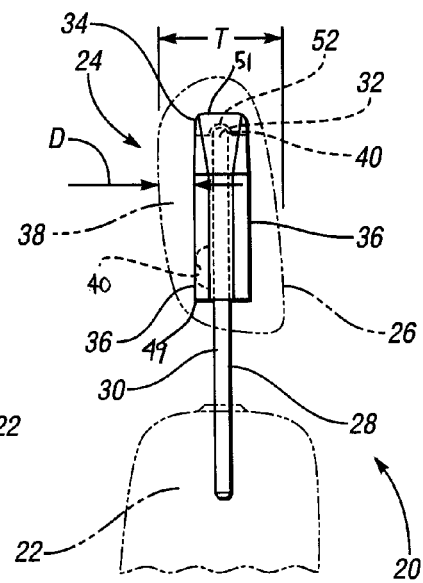
Fig. 1  Fig. 2
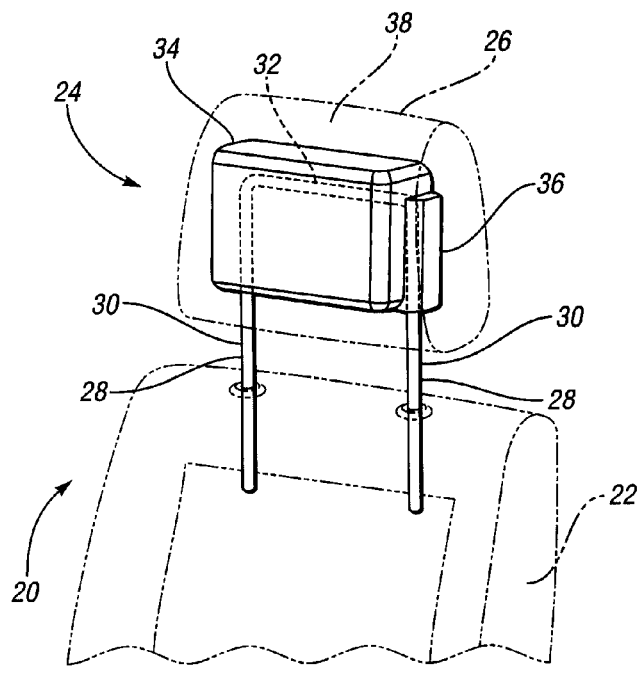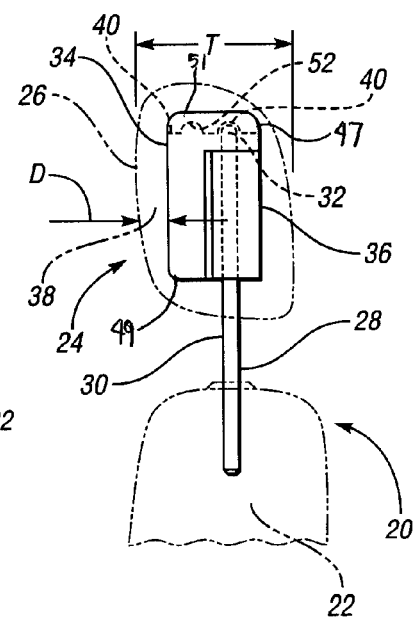
Fig. 3  Fig. 4

US 8,573,701 B2

SUPPORT MEMBER FOR VEHICLE SEAT HEAD RESTRAINT

CROSS-REFERENCE TO RELATED APPLICATIONS

This application is a division of U.S. application Ser. No. 12/243,130 filed Oct. 1, 2008, the disclosure of which is incorporated in its entirety by reference herein.

BACKGROUND

1. Technical Field

Multiple embodiments relate to inserts for vehicle seat head restraints.

2. Background Art

Occupants of motor vehicles have long suffered head, neck and spinal injuries during events such as rear vehicle impact or sudden deceleration. Typically, a vehicle head restraint is constructed with compressible foam surrounding a head restraint post. In a rear impact event, the occupant's head contacts the top of the vehicle head restraint with sufficient force to result in a significant deflection of the foam. The magnitude of neck deflection increases as the head further compresses the foam. Furthermore, because the foam is sufficiently resilient, the energy imparted to the foam by the occupant's head is mostly stored and not dissipated. As such, when the rear collision event has ended, the energy stored within the foam is released into the occupant's head, which causes the occupant's head to move rapidly forward possibly causing further injury to the vehicle occupant.

BRIEF DESCRIPTION OF THE DRAWINGS

FIG. 1 is a perspective view of an embodiment of a vehicle seat assembly having a head restraint assembly;

FIG. 2 is a side elevation view of the vehicle seat assembly of FIG. 1;

FIG. 3 is a perspective view of another embodiment of a vehicle seat assembly having a head restraint assembly;

FIG. 4 is a side elevation view of the vehicle seat assembly of FIG. 3;

DETAILED DESCRIPTION OF EMBODIMENTS

Figure 7:
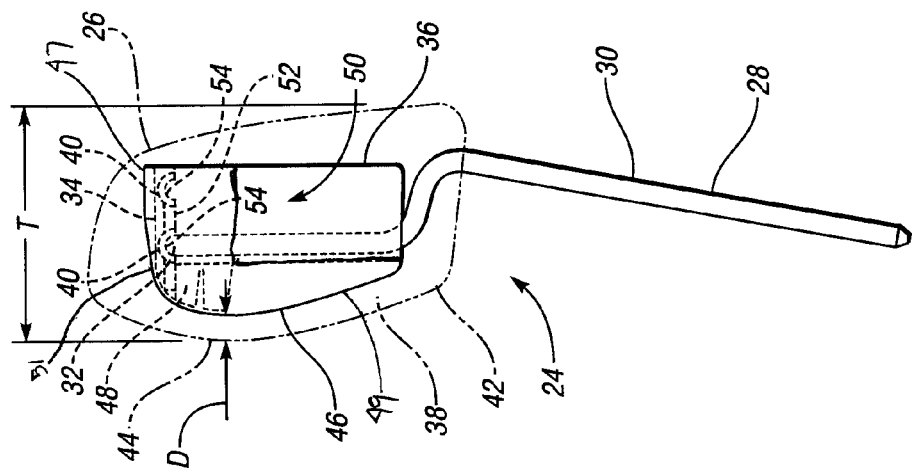
FIG. 7 is a side elevation view of the vehicle head restraint assembly of FIG. 6 in an alternate configuration.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIGS. 1-4, a vehicle seat is illustrated and referenced generally by numeral 20. The vehicle seat may include a seat bottom secured to a floor of an associated vehicle for seating an occupant upon the seat bottom. A seat back 22 extends from the seat bottom and is secured relative to the seat bottom for supporting a back of the occupant against the seat back 22. The seat back 22 may pivot relative to the seat bottom to permit ingress and egress to and from a rear seating row and/or to permit an occupant to select a comfortable riding position while sitting in the vehicle seat 20.

In the depicted embodiments, a head restraint assembly 24 is mounted to the seat back 22 of the vehicle seat 20. The head restraint assembly 24 has a head restraint 26 supported by head restraint posts 28. The head restraint assembly 24 need not be directly mounted to the seat back 22 and may be mounted indirectly to the seat back 22 in any suitable manner, such as via a secondary frame or support. Alternatively, the head restraint assembly 24 can be mounted directly to the vehicle body. The head restraint post 28 may be constructed from a metal tube or rod bent to resemble the shape shown in FIGS. 1-4. Head restraint post 28 includes a pair of substantially parallel, upright portions 30 interconnected by a substantially horizontally oriented crossbar portion 32.

As illustrated, the head restraint 26 may have a support member 34 mounted to a base member 36. The head restraint posts 28 can be mounted to the support member 34. The support member 34 can be employed in various head restraints 26 having various thicknesses. The support member 34 may be an injection molded plastic component. However, support member 34 may be constructed from sheet steel, aluminum or any other suitable structural material such as expanded polypropylene (EPP) or expanded polyethylene (EPE). In at least one embodiment, the support member 34 is mounted to a base member 36.

As illustrated in FIGS. 2 and 4, the support member 34 has attachment receptacles 40 provided therein, which are sized to receive a portion of the head restraint post 28 to mounts the head restraint 26 to the seat back 22, as discussed in detail below. In at least one embodiment, the attachment receptacles 40 are sized to receive the crossbar portion 32 of the head restraint post 28. The attachment receptacles 40 are provided at various locations within the support member 34 so that one support member 34 can be employed in various head restraints 26 having various thicknesses T. In FIG. 2, the thickness T of the head restraint 26 is relatively small compared to the thickness T of the head restraint 26 illustrated in FIG. 4.

Figure 6:
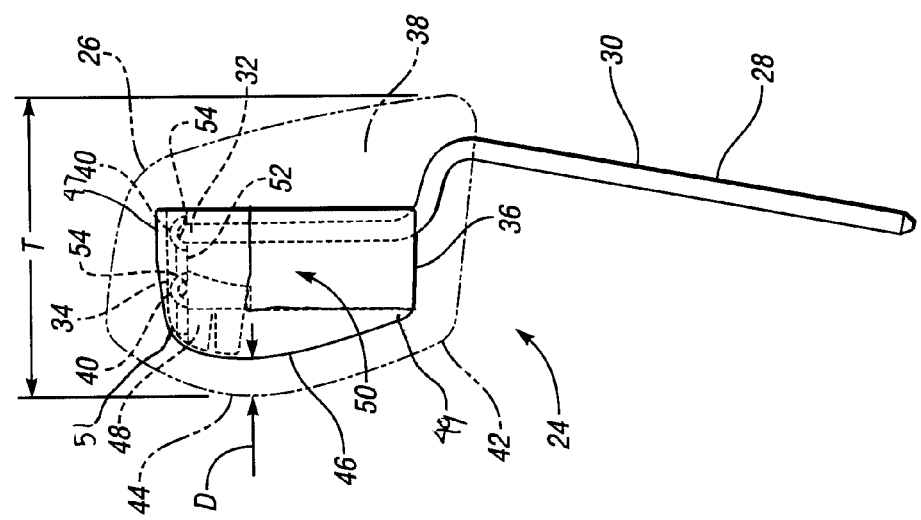
FIG. 6 is a side elevation view of another embodiment of the vehicle head restraint assembly of FIG. 5.
Figure 5:
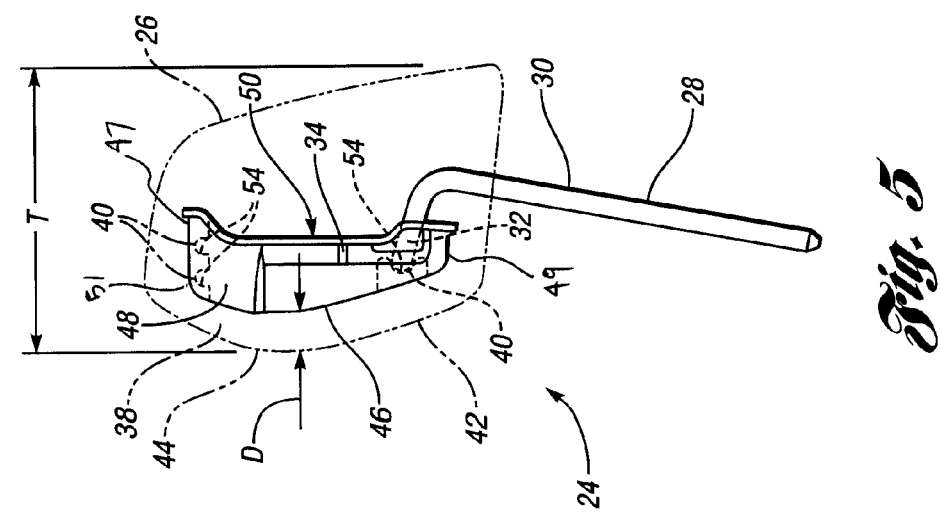
FIG. 5 is a side elevation view of an embodiment of a vehicle head restraint assembly.

As depicted in FIGS. 1-7, a compressible pad member 38 may surround the support member 34. Compressible pad member 38 may encompass support member 34 to provide an aesthetically pleasing and comfortable surface for supporting the vehicle occupant's head. Compressible pad member 38 may be separately molded and slit to accept support member 34 or may be directly injection molded over support member 34 and the uppermost section of head restraint post 28. Compressible pad member 38 may be constructed from urethane foam of a type typically used to make head restraint pads. Compressible pad member 38 is sized and shaped to minimize the deflection of the vehicle occupant's neck during a rear end collision. A trim cover 42 may enclose the compressible pad member 38. The compressible pad member 38 may include an outer convex surface 44 to support a posterior side of an occupant's head and neck, as illustrated in FIGS. 5-7.

In at least one embodiment, the trim cover 42 is mounted directly to the support member 34 so that the compressible pad member 38 is eliminated and a distance D is measured between an inner surface 52, illustrated in FIGS. 5-7, and the trim cover 42. The support member 34 may be made out of a compressible foam material such as EPP or EPE to support the posterior side of an occupant's head and neck.

Referring now to FIGS. 2, 4, and 5-7, the support member 34 includes a front wall 46 bounded by side walls 48. Front wall 46 and side walls 48 define a generally hollow shell 50. The support member 34 may have a longitudinal portion 47 extending from the front wall 46 and includes a lower portion 49 and an upper portion 51. As illustrated, the longitudinal portion 47 is formed in the upper portion 51. Of course, the longitudinal portion 47 may extend from the front wall 46 at any location of the support member 34 as desired.

Attachment receptacles 40 may be integrally formed within an inner surface 52 of the front wall 46. Each attachment receptacle 40 may include an inner arcuate surface 54 that can engage the crossbar portion 32 of head restraint post 28. The inner arcuate surface 54 may define an arc length of at least 180 degrees so that the attachment receptacles 40 can be snap-fit to crossbar portion 32 to connect the support member 34 and the head restraint post 28.

As illustrated, the attachment receptacles 40 may be formed in the longitudinal portion 47 of the support member 34. In at least one embodiment, illustrated in FIGS. 2 and 5, an attachment receptacle 40 can be formed in the lower portion 49 of the support member 34. Of course, any suitable location within the support member 34 is contemplated within the scope of the disclosed embodiments. Providing multiple locations of the attachment receptacles 40 allows for one support member 34 to be employed in head restraints 26 having various thicknesses T while allowing the support member 34 to be mounted a desired distance D from an outer surface 44 of the compressible pad member 38.

The compressible pad member 38 may include the outer convex surface 44, which is spaced apart from the front wall 46 of support member 34. The outer convex surface 44 defines a radius sized to conform to the geometry of the posterior side of the occupant's head and neck. The outer convex surface 44 of the compressible pad member 38 is provided a distance D from the front wall 36 of the support member 34. The distance D can be at large as approximately 60 millimeters. This range of distance assures that a vehicle occupant's head is sufficiently cushioned during the collision while at the same time assuring that load is transferred to support member 34 to resist further neck deflection of the vehicle occupant. In at least one embodiment, the distance D is approximately equal to 20 millimeters to comfortably support the posterior side of the occupant's head and neck. In another embodiment, the distance D is occupant's head and neck is approximately 10 millimeters.

The support member 34 effectively reduces the distance D so that maximum neck-deflection of the occupant is reduced. Furthermore, because the support member 34 includes the front wall 46, the magnitude of load imparted to the posterior side of the vehicle occupant's head is maintained within reasonable limits. Additionally, the amount of foam between the vehicle occupant's head and the support member 34 has been reduced by the disclosed embodiments to store less energy within the foam during a rear impact event. As such, tendency of the compressed foam 38 to fling the vehicle occupant's head forward after the rear impact event is reduced.

Figure 8:
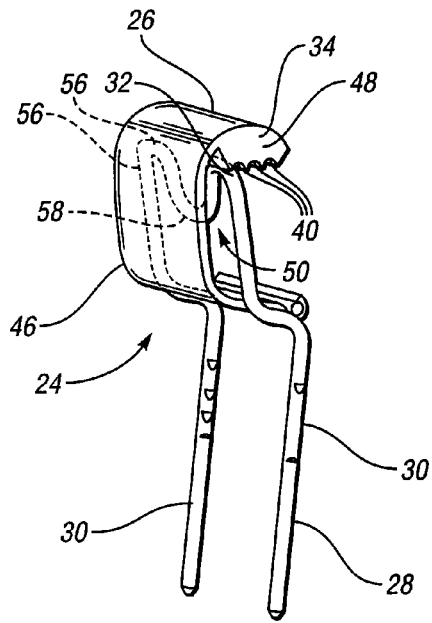
FIG. 8 is a front perspective view of a portion of an embodiment of a vehicle head restraint assembly.
Figure 9:
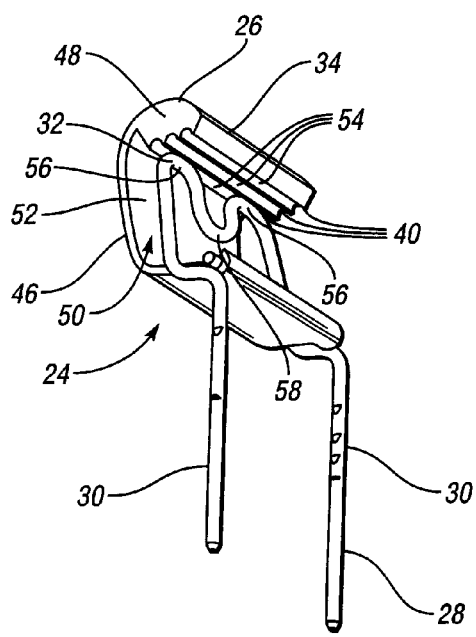
FIG. 9 is a rear perspective view of the vehicle head restraint assembly of FIG. 8.

With reference now to FIGS. 8-9, a portion of an embodiment of the head restraint assembly 24 is illustrated. The head restraint assembly 24 includes a head restraint post 28 including a pair of substantially parallel upright portions 30 interconnected by a crossbar portion 32. The crossbar portion 32 has a serpentine shape having two peaks 56 interconnected by a trough 58.

The attachment receptacles 40 of support member 34 may be provided between the opposing side walls 48 to engage the peaks 56 of head restraint post 28 and/or portions of the crossbar portion 32 of head restraint post 28.

Figure 10:
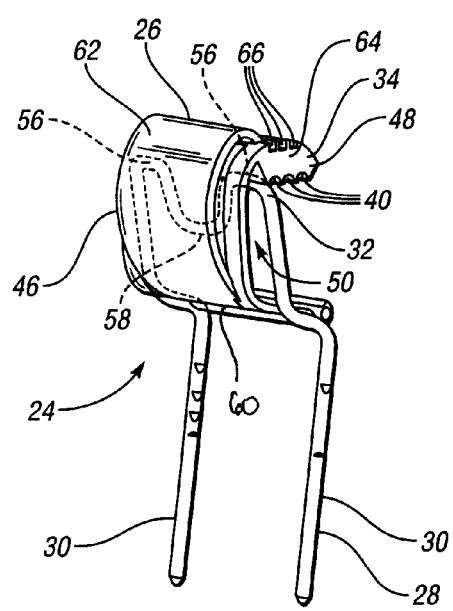
FIG. 10 is a front perspective view of another embodiment of a vehicle head restraint assembly.
Figure 11:
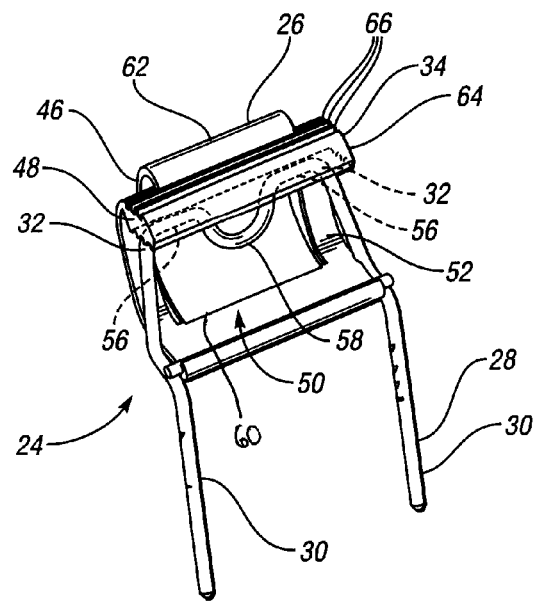
FIG. 11 is a rear perspective view of the vehicle head restraint assembly of FIG. 10.

Referring to FIGS. 10-11, another embodiment of a portion of the head restraint assembly 24 is illustrated. As illustrated, the support member 34 includes a living hinge 60 mounted between a moveable portion 62 of the support member 34 and a fixed portion 64 of the support member 34. The living hinge 60 within the support member 34 is a joint that allows for adjustment of the front wall 46 so that the front wall 46 can be provided a distance from the outer convex surface of the compressible pad member, as described above.

In at least one embodiment, the fixed portion 64 has receptacles 66 provided therein to receive the moveable portion 62. The receptacles 66 can retain the moveable portion 62 therein to retain the moveable portion 62 in a fixed orientation, which allows for the front wall 46 of the support member 34 to be provided at a distance from the outer convex surface of the compressible pad member, as described above.

Figure 12:
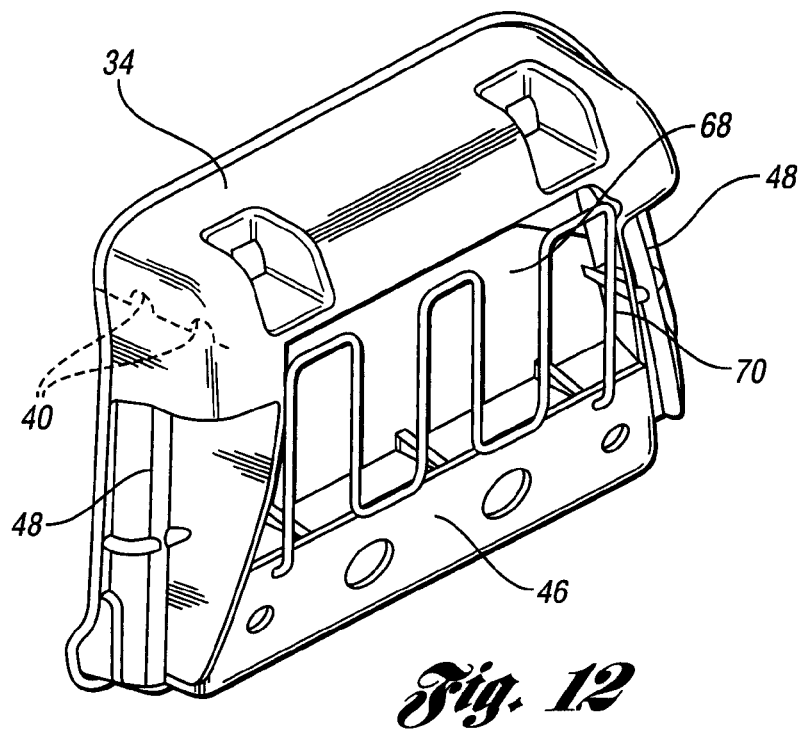
FIG. 12 is a front perspective view of a portion of an embodiment of a vehicle head restraint assembly.
Figure 13:
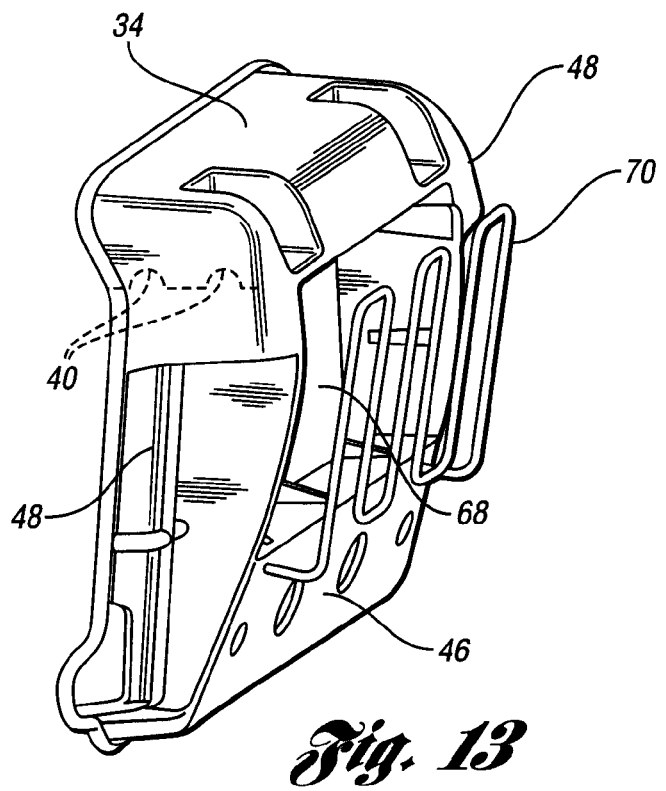
FIG. 13 is another perspective view of the portion of the vehicle head restraint assembly of FIG. 12.

In FIGS. 12-13, another embodiment of the support member 34 is illustrated. The support member 34 has side walls 48 that are upright portions and define an aperture 68 therebetween. As illustrated, a support wire 70 is mounted to the side walls 48 across the aperture to support the compressible pad member 38 and allow movement thereof. As illustrated, the support wire 70 may be mounted directly to the front wall 46 of the support member 34. The support wire 70 can extend beyond the surface of the front wall 46 of the support member 34. Of course, any suitable support wire 70 may be employed within the scope of the embodiments disclosed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A head restraint assembly for a vehicle seat, the head restraint assembly comprising:
    a head restraint post adapted to be mounted within a vehicle proximate a vehicle seatback;
    a support member for use in various head restraints having various thickness, the support member comprising:
        a fixed portion coupled to the head restraint post, the support member having a plurality of attachment receptacles provided at a plurality of locations so that the support member can be employed in the various head restraints having various thickness, wherein the head restraint post is mounted to only one of the plurality of attachment receptacles;
        a movable portion defining a front wall of the support member and movably coupled to the fixed portion; and
    a compressible pad member mounted to the support member having an outer surface to provide support for a head of an occupant, wherein the outer surface of the compressible pad is located a fixed distance from the front wall of the support member so that while limiting the head restraint post to only one of the plurality of attachment receptacles after the support member is mounted to the head restraint post; and a hinge connecting the movable portion to the fixed portion such that the hinge pivots the movable portion to position the front wall of the support member the fixed distance from the outer surface of the compressible pad member, wherein the movable portion is movable to maintain the outer surface of the compressible pad at a fixed location relative to the head restraint post in each of the various head restraints having various thickness while the head restraint assembly is in use.

2. The head restraint assembly of claim 1 wherein the head restraint post is coupled to the support member by an interference fit.

3. The head restraint assembly of claim 1 wherein the head restraint post is mounted to one of the attachment receptacles in a fixed mounting position that is adjustable in order to be employed in various head restraints having various thickness.

4. The head restraint assembly of claim 1 wherein the support member further comprises a longitudinal portion extending along a fore/aft direction from the front wall of the support member having at least one attachment receptacle provided therein to receive the head restraint post, the plurality of attachment receptacles provided in the longitudinal portion further comprises:

a first attachment receptacle formed therein; and
a second attachment receptacle formed therein and spaced apart longitudinally from the first attachment receptacle so that the head restraint can be employed in head restraints that vary in thickness in the fore/aft direction.

5. The head restraint assembly of claim 4 wherein the front wall is formed along an upright portion such that the upright portion and the longitudinal portion is integrally formed in the support member.

6. The head restraint assembly of claim 1 wherein the fixed portion of the support member defines at least one receptacle sized to receive the movable portion to retain the movable portion therein.

7. The head restraint assembly of claim 1 wherein the head restraint post further comprises a pair of substantially upright portions adapted to be mounted to the vehicle seat and a crossbar portion interconnecting the upright portions.

8. The head restraint assembly of claim 7 wherein the crossbar portion of the head restraint post includes a serpentine shape.

9. The head restraint assembly of claim 1 wherein the attachment receptacles are formed along a lower surface of the fixed portion and for mating with the head restraint post, and further comprising a plurality of attachment features formed along an upper surface of the fixed portion thereby ensuring the outer surface of the compressible pad is maintained at the fixed distance from the head restraint post.

10. A method of assembling a head restraint assembly comprising:

providing a head restraint post adapted to be mounted to a vehicle seat;
providing a support member having a movable portion defining a front wall of the support member and a fixed portion with a plurality of attachment receptacles at various locations within the support member so that the support member can be employed in various head restraints having various thickness;
providing a compressible pad member having an outer surface to provide support for a head of an occupant;
coupling the head restraint post to the support member within only one of the plurality of attachment receptacles;
mounting the compressible pad member to the support member such that the outer surface of the compressible pad is positioned a fixed distance from a front wall of the support member;
positioning the movable portion to maintain the front wall of the movable portion at a fixed mounting location relative to the head restraint post so that the head restraint post is limited to being mounted to only one of the plurality of attachment receptacles after the support member is mounted to the head restraint post while the head restraint assembly is in use; and
coupling the movable portion to one of the plurality of attachment features formed along an upper surface of the fixed portion thereby ensuring the outer surface of the compressible pad is maintained at the fixed distance from the head restraint post.

11. The method of claim 10 further comprising fixedly coupling the head restraint post to the support member by an interference fit.

12. The method of claim 10 further comprising mounting the head restraint to one of the attachment receptacles in a fixed mounting position that is not adjustable in each of the various head restraints having various thickness.

13. A method of assembling a head restraint assembly comprising:

providing a support member, having a movable portion defining a front wall of the support member and a fixed portion with a plurality of attachment receptacles at various locations along the support member so that the support member can be employed in various head restraints having various thickness;
coupling a head restraint post to one of the attachment receptacles to form a first head restraint having a first thickness;
moving the movable portion to a first position to position the front wall a fixed distance relative to the head restraint post in the first head restraints having the first thickness;
coupling the head restraint post to another one of the attachment receptacles within the support member to form a second head restraint having a second thickness being different from the first thickness; and
moving the movable portion to a second position to position the front wall the fixed distance relative to the head restraint post in the second head restraint having the second thickness,
wherein coupling the movable portion to one of the plurality of attachment features formed along an upper surface of the fixed portion thereby ensures an outer surface of a compressible pad is maintained at the fixed distance from the head restraint post.

14. The method of claim 13 wherein coupling the head restraint post to one of the attachment receptacles further comprises coupling the head restraint post to one of the attachment receptacles by an interference fit.

15. The method of claim 13 wherein coupling the head restraint post to one of the attachment receptacles further comprises coupling the head restraint post to one of the attachment receptacles in a fixed mounting position that is not adjustable in each of the various head restraints having various thickness.

16. The method of claim 13 further comprising mounting the compressible pad member to the support member, the support member having the outer surface to provide support for a head of an occupant, wherein after the support member is mounted to the head restraint post, the outer surface of the compressible pad is maintained at a fixed location relative to the head restraint post while the head restraint assembly is in use.

17. The method of claim 16 further comprising:
providing a hinge connected to the movable portion of the support member such that the movable portion is moveable about the hinge.

* * * * *